(12) United States Patent
Kaji et al.

(10) Patent No.: US 10,992,197 B2
(45) Date of Patent: Apr. 27, 2021

(54) STATOR FOR ELECTRIC ROTATING MACHINE

(71) Applicant: DENSO CORPORATION, Kariya (JP)

(72) Inventors: Takefumi Kaji, Kariya (JP); Atsuo Ishizuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 9 days.

(21) Appl. No.: 16/507,481

(22) Filed: Jul. 10, 2019

(65) Prior Publication Data

US 2019/0334397 A1 Oct. 31, 2019

Related U.S. Application Data

(63) Continuation of application No. PCT/JP2018/000452, filed on Jan. 11, 2018.

(30) Foreign Application Priority Data

Jan. 13, 2017 (JP) .............................. JP2017-004405

(51) Int. Cl.
  *H02K 3/12* (2006.01)
  *H02K 1/16* (2006.01)
  *H02K 1/24* (2006.01)

(52) U.S. Cl.
  CPC ................ *H02K 3/12* (2013.01); *H02K 1/16* (2013.01); *H02K 1/24* (2013.01)

(58) Field of Classification Search
  CPC ...... H02K 15/10; H02K 15/105; H02K 15/12; H02K 15/125; H02K 3/30; H02K 3/32
  USPC .... 174/72 B, 71 B, 38.2, 88 B, 70 B, 137 R, 174/138 R
  See application file for complete search history.

(56) References Cited

U.S. PATENT DOCUMENTS

| 5,936,326 A | 8/1999 | Umeda et al. |
| 2011/0181144 A1 | 7/2011 | Ishizuka et al. |
| 2014/0035406 A1 | 2/2014 | Ishizuka et al. |

FOREIGN PATENT DOCUMENTS

JP    H11-341730 A    12/1999

*Primary Examiner* — Terrance L Kenerly
(74) *Attorney, Agent, or Firm* — Oliff PLC

(57) ABSTRACT

A stator for a rotating electric machine has a stator core provided with a plurality of slots arranged in a circumferential direction of the stator core, and a stator winding that is wound around the slots. The stator winding is configured of a plurality of covered conductor linear portions. The covered conductor linear portions are each provided with an exposed portion formed on an end. The plurality of covered conductor linear portions are each joined to another covered conductor linear portion at the exposed portion, and the conductor joined portion is covered by an insulator at least in a range that includes an end portion of the insulation cover. The insulation cover covers the conductor, in an adhered state there to, and has a low-adhesion portion that that is either adhesive-free or has a lower adhesive strength than other parts on the conductor and is distanced from an end portion.

20 Claims, 8 Drawing Sheets

STATOR FOR ELECTRIC ROTATING MACHINE

CROSS-REFERENCES TO RELATED APPLICATION

This application is a continuation application of International Application No. PCT/JP2018/000452 filed on Jan. 11, 2018, which claims priority to Japanese Application No. 2017-004405, filed on Jan. 13, 2017, the entire contents of the above applications are incorporated herein by reference.

BACKGROUND

Technical Field

The present disclosure relates to a stator for an electric rotating machine that is used as a motor or a generator, mounted in a vehicle.

Related Art

There is known a stator for an electric rotating machine has slots provided on a stator core and stator windings that are wound onto the slots. The stator windings have a plurality of conductor segments inserted into the slots, for example, and by joining each segment to another segment, a stator winding for each phase of the electric rotating machine is configured.

SUMMARY

There is provided a stator for a rotating electric machine has a stator core provided with a plurality of slots arranged in a circumferential direction of the stator core, and a stator winding that is wound around the slots. The stator winding is configured of a plurality of covered conductor linear portions which are linear conductors that are covered by an insulation cover. The covered conductor linear portion are each provided with an exposed portion that is formed on an end of the covered conductor linear portion. The plurality of covered conductor linear portions are each individually joined to another covered conductor linear portion at the exposed portion, and the conductor joined portion is covered by an insulator at least in a range that includes an end portion of the insulation cover. The insulation cover is disposed to cover the conductor, in an adhered state to the conductor, and has a low-adhesion portion that is adhesive-free or has a lower adhesive strength than other parts on the conductor and is distanced from an end portion, on an exposed portion side.

BRIEF DESCRIPTION OF DRAWINGS

In the accompanying drawings.

Embodiments

Figure 1:
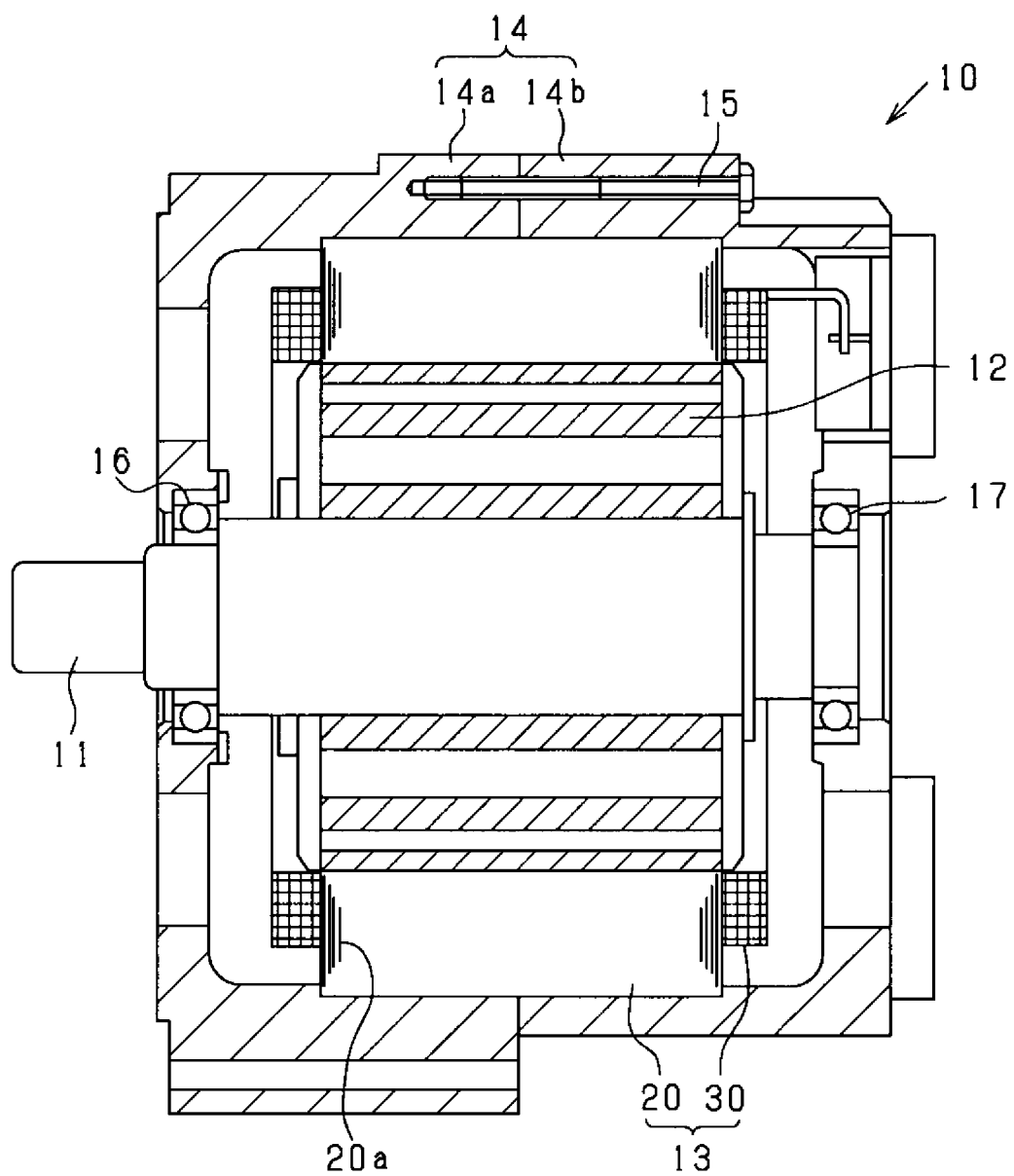
FIG. 1 is an axial cross-sectional drawing of an electric rotating machine.

In the technical field concerning the present disclosure there is a known stator provided with a conductor segment that is constituted of a covered conductor wire that is a linear shaped conductor covered by an insulation cover. The conductor segment is joined to another conductor segment at an exposed surface on an end of the conductor segment. A conductor-joining section is covered by an insulator, in at least a range that includes an end portion of the insulation cover. In the configuration described, insulation properties of the conductor-joining portion are secured by the insulator that covers the conductor-joining part on the rotating machine.

However, by repeated increase of the temperature to a temperature that is higher than room temperature when using the electric rotating machine, cracking of the insulator of the conductor-joining portion may occur around an end portion of the insulation cover layer provided on the conductor segment. Furthermore, there are concerns of the cracking progressing and the insulator peeling off the conductor segment, for example. The cracking of the insulator may be caused by a difference in a linear expansion coefficient between the insulation cover of the conductor segment and the insulator that covers the conductor-joining portion or stress concentration that occurs on the end portion of the insulation cover, which is caused by a temperature change, for example.

In light of the conventional stator, it is desired to provide a stator for an electric rotating machine in which cracking of an insulator that covers a conductor-joining portion is suppressed, and a stator winding is desirably protected.

Various Embodiments

Hereinafter, various embodiments will be described with their structures and effects.

A first embodiment is an annular stator for an electric rotating machine. The stator is provided with a stator core that has a plurality of slots configured in a circumferential direction thereof and a stator winding that is configured of a plurality of covered conductor linear portions that are linear-shaped conductors each of which are covered by an insulation cover, and the plurality of linear conductors are provided with exposed portions that are exposed by the conductor. The plurality of covered conductor linear portions are joined to each other at the exposed end portion by joining one conductor linear portion to a second conductor linear portion to form a conductor-joining portion, and the conductor-joining portion is covered by an insulator in a range that includes at least an end portion of the insulation cover.

The insulation cover is provided to cover the conductor in an adhered state to the conductor, and has a low-adhesion portion, which is free from adhesion to the conductor, or has a lower adhesive strength to the conductor is than to other parts of the insulation cover.

However, when the stator for the electric rotating machine is used and an increase and decrease of temperature is repeatedly performed, situations occur in which a size of the insulation cover occurs on the covered conductor linear portion (specifically, contraction and expansion thereof) changes. As a consequence, there are concerns of the insulator cracking (specifically, the insulator covering the conductor-joining portion) due to the change in the area of the insulation cover.

In this regard, according to the configuration described, the insulation cover is provided to cover the conductor in the adhered state, and has the low-adhesion portion, which is free from adhesion or the adhesion force to the conductor is weaker than an adhesive strength to other parts to the conductor. The low-adhesion portion is provided in a position that is distanced from the end portion on a side of the exposed portion. Therefore, since the low-adhesion portion is configured, cracking of the insulator that is caused by the increase and decrease of the temperature can be suppressed.

Since the insulation cover has the low-adhesion portion, if a change in the size of the insulation cover occurs relative to the insulator that covers the conductor-joining portion, the change in the size is adsorbed at the low-adhesion portion, and stress (shear stress) that arises due to the change in the size thereof is decreased. As a result, cracking of the insulator that covers the conductor-joining part, for example, is suppressed, and the stator winding may be protected.

A second embodiment is the insulation cover is provided with an adhesion portion that has a stronger adhesive strength than the low-adhesion portion. The adhesion portion is disposed between the end-portion on a side of the exposed portion, and the low-adhesion portion.

Generally, it is considered that the insulation cover has pulling residual stress on the covered conductor linear portion. The pulling residual stress may occur when the insulation cover is formed by polymerization of the insulation cover on the conductor after the insulation cover is varnish coated onto the conductor, or may occur due to expansion of the covered conductor linear portion when the covered conductor wire is wound onto a reel. On the other hand, pulling residual stress may also occur when the stator is processed at the point of manufacturing.

According to the configuration described, the insulation cover is provided with the adhesion portion provided between the end-portion on the side of the exposed portion and the low-adhesion portion. Since the adhesion portion has a higher adhesive strength than the low-adhesion portion, and pulling residual stress at the low-adhesion portion is maintained at the adhesion portion. As a consequence, when expansion, for example, of the insulation cover occurs due to a change in the temperature, the volume expansion of the insulation cover can be desirably adsorbed at the low-adhesion portion.

A third embodiment is the conductor has a surface with a recessed part formed on the surface, and the insulation cover has the low-adhesion portion positioned to cover the recessed part on the conductor surface.

In the third embodiment, the covered conductor linear portion has the insulation cover in a close contact state to cover the conductor, and although the insulation cover is in the adhered state to the conductor, since the recessed part is formed on the surface of the conductor, the insulation cover is easily moved away from the conductor in a vertical direction and thus the low-adhesion portion can be desirably provided.

In a fourth embodiment, the conductor has the recessed part that is recessed towards a cross sectional inside of the conductor. In the configuration, the conductor has the recessed part that is recessed in a predetermined direction of the cross section, and expanded in direction that is orthogonal to the predetermined cross section direction.

According to the fourth embodiment, the insulation cover is pulled in a length-wise direction and a direction orthogonal to the lengthwise direction of the conductor. The insulation cover is easily moved away from the conductor, above the conductor in the vertical direction. As a result, the low-adhesion portion can be formed on the insulation cover. It is noted that the conductor is recessed at the recessed part by pressing, for example, with a pressing process on the covered conductor wire, and expansion may be thus performed in the direction orthogonal to the predetermined direction.

In a fifth embodiment of the present disclosure, the recessed part has an outside edge formed in an oval shaped, provided on the side of the exposed portion.

According to the configuration described, since the outside edge of the recessed part is formed as an oval shape on the conductor, an interface between the low-adhesion portion and the adhesion portion is also oval shaped. In this view, according to the configuration described above, since stress concentration occurs with difficulty at the interface between the low-adhesion portion and the adhesion portion, the size of the low-adhesion portion can be suitably maintained.

A sixth embodiment of the present disclosure is the covered conductor linear portion has a length-wise direction, the low-adhesion portion has a low adhesion starting point, and the low-adhesion starting point of the low-adhesion portion is positioned further to an outer-side of the covered conductor linear portion than a starting point of the recessed part, in the length-wise direction of the covered conductor linear portion.

In this configuration, the low-adhesion portion is provided along a wider region than the recessed part in the lengthwise direction of the covered conductor linear portion. In other words, the recessed part is configured in a smaller range than the low-adhesion portion. In this respect, whilst providing the low-adhesion portion on the insulation cover, the recessed part can be maintained at a minimum size therefore, a decrease in the motor efficiency due the inverted portion can be suppressed. That is, since the recessed part is provided, concerns of a decrease in the motor efficiency may arise to due to a smaller cross section thereof. However, by decreasing the length of the recessed part, the decrease in the motor efficiency is suppressed, by providing the above-described recessed part whilst desirably providing the low-adhesion portion.

A seventh embodiment of the present disclosure is the low-adhesion portion has an interface that is oval shaped, disposed between the adhesion portion and the low-adhesion portion.

According to the configuration, excess spreading of the low-adhesion portion is suppressed and a large decrease in the adhesion between the conductor and the insulation cover can also be suppressed. That is, if a stress concentration point at a corner portion exists at an interface between the low-adhesion portion and the adhesion portion, detachment of the insulation cover at the stress concentration point occurs easily by the contraction and the expansion that is caused by pulling stress, or a change in the temperature at the low-adhesion portion. Furthermore, undesirable broadening of the low-adhesion portion also occurs. According to the configuration of the present disclosure, concentration of stress at the interface between the non-adhesion portion and the adhesion portion occurs with difficulty, and a size of the non-adhesion portion can be desirably maintained.

An eighth embodiment of the present disclosure is the covered conductor linear portion has a bent portion, arranged between a first side in which the exposed portion is disposed and a second side in which the low-adhesion portion in disposed. The bent portion has an inner-side surface that is bent inwardly and outer-side surface that is bent outwardly, and the low-adhesion portion is arranged on a surface that is orthogonal to the inner-side surface and the outer-side surface of the bent portion.

The covered conductor linear portion is bent on a coil end, for example, of the stator for the electric rotating machine. If the exposed portion is provided on the first end and the low-adhesion portion provided on the second-end with the bent portion intervened in between, it may be difficult to adsorb a change in the size of the insulation cover around an end part of the covered conductor linear portion, as a consequence of the bent portion. However, since the low-adhesion portion is provided on a surface that is orthogonal to the inner-side surface and the outer-side surface, the change in the size of the insulation cover is desirably adsorbed at the low-adhesion portion.

A ninth embodiment of the present disclosure is the low-adhesion portion that is adjacent to the adhesion portion has an insulation cover thickness that is lower than the insulation cover thickness of the adhesion portion.

The covered conductor linear portion is provided with the insulation cover that allows oxygen to pass through, and the surface of the conductor is thus oxidized by the oxygen. The adhesive strength of the insulation cover that is adhered to the conductor is decreased by the oxidation on the surface of the conductor. According to the configuration described, since the thickness of the insulation cover at the low-adhesion portion is thinner than the thickness at the adhesion portion adjacent thereto, the amount of oxygen that passes through the low-adhesion portion is increased, and the conductor that is positioned below the low-adhesion portion is easily oxidized. In this case, a thickness of the oxidized cover at the low-adhesion portion can be intentionally greater in thickness than other parts of the insulation cover, and a low-adhesion portion is desirably provided.

In a tenth embodiment of the present disclosure, the low-adhesion portion is configured by an oxidized layer that is formed on a portion of the conductor surface that is covered by the insulation cover.

As described herein above, the adhesive strength of the insulation cover to the conductor is decreased by oxidation of the conductor surface. As a result, by forming the oxidized layer on the conductor surface that is covered by the insulation cover, the low-adhesion portion can be desirably formed on a part of the conductor surface that is covered by the insulation cover.

An eleventh embodiment of the present disclosure is the oxidized layer positioned at the low-adhesion portion has a greater thickness than the oxidized layer positioned at the adhesion portion that is adjacent to the low-adhesion portion of the conductor surface.

According to the configuration, the greater the thickness of the oxidized layer is on the conductor surface, the greater the decrease is in an adhesive strength of the insulation cover. As a consequence, the low-adhesion portion on the conductor line can be stably provided.

In a twelfth embodiment of the present disclosure, the plurality of covered conductor linear portions are provided with coil-end portions that extend an axial direction from the slot to an outside. The conductor-joining portion and the low-adhesion portion are provided on each coil-end portion.

The plurality of covered conductor linear portions each having a middle portion that is free and un-joined to a middle portion of another covered conductor linear portion, on the coil-end portion, and the low-adhesion portion can be thus desirably provided on the coil-end portion. Additionally, since the low-adhesion portion is arranged near to the conductor-joining portion (insulator) on the coil-end portion, changes in the size of the insulation cover are desirably adsorbed by the low-adhesion portion.

A thirteenth embodiment is the plurality of the covered conductor linear portions have coil-end portions that extend in the radial direction from the slot to the outside. A length from the exposed portion to the low-adhesion portion is provided in a range that is less than half of a length of the coil-end portion.

According to the configuration, a low-adhesion portion can be desirably provided on the insulation cover since the plurality of covered conductor linear portions have middle sections that are un-joined to each other. Additionally, since the low-adhesion portion is provided in a close vicinity of the conductor-joining portion (insulator) on the coil-end portion, changes in the size of the insulation cover can be desirably adsorbed at the low-adhesion portion.

A fourteenth embodiment will now be described based on FIG. 1 to 13.

It is noted that the same symbols in the embodiments correspond to configuring elements or the equivalent exemplified in the drawings.

An electric rotating machine 10 in the fourteenth embodiment is used as an alternate current generator for a vehicle. The electric rotating machine 10 shown in FIG. 1 is provided with rotor that is fixed to a rotating shaft 11, a stator 13 positioned as a closure around the rotor 12, and a housing 14 that accommodates the rotor 12 and the stator 14. The housing 14 has a pair of tubular housing members 14a and 14b provided with a bottom, and openings that joins the housing members to each other. With the housing members provided in the joined state, a bolt 15 is fastened, and the housing 14 and the housing members 14a and 14b are thus assembled as one body.

The housing 14 is provided with axle bearings 16 and 17, and rotation of the rotor shaft 11 and the rotor 12 are supported axle bearings. The rotor 12 includes a plurality of magnetic poles that are disposed in a circumferential direction thereof, so that a polarity is alternated on an outside, opposed to the radial direction of the inner peripheral side of the stator 13. The magnetic poles are formed from a plurality of permanent magnets embedded at predetermined positions in the rotor 12. Since the number of magnetic poles provided on the rotor differ in accordance with the electric rotating machine, the number of magnetic poles is not limited to a specific number. In the present embodiment, a rotor that has 8 poles (4 N poles and 4 S poles) is used.

Figure 2:
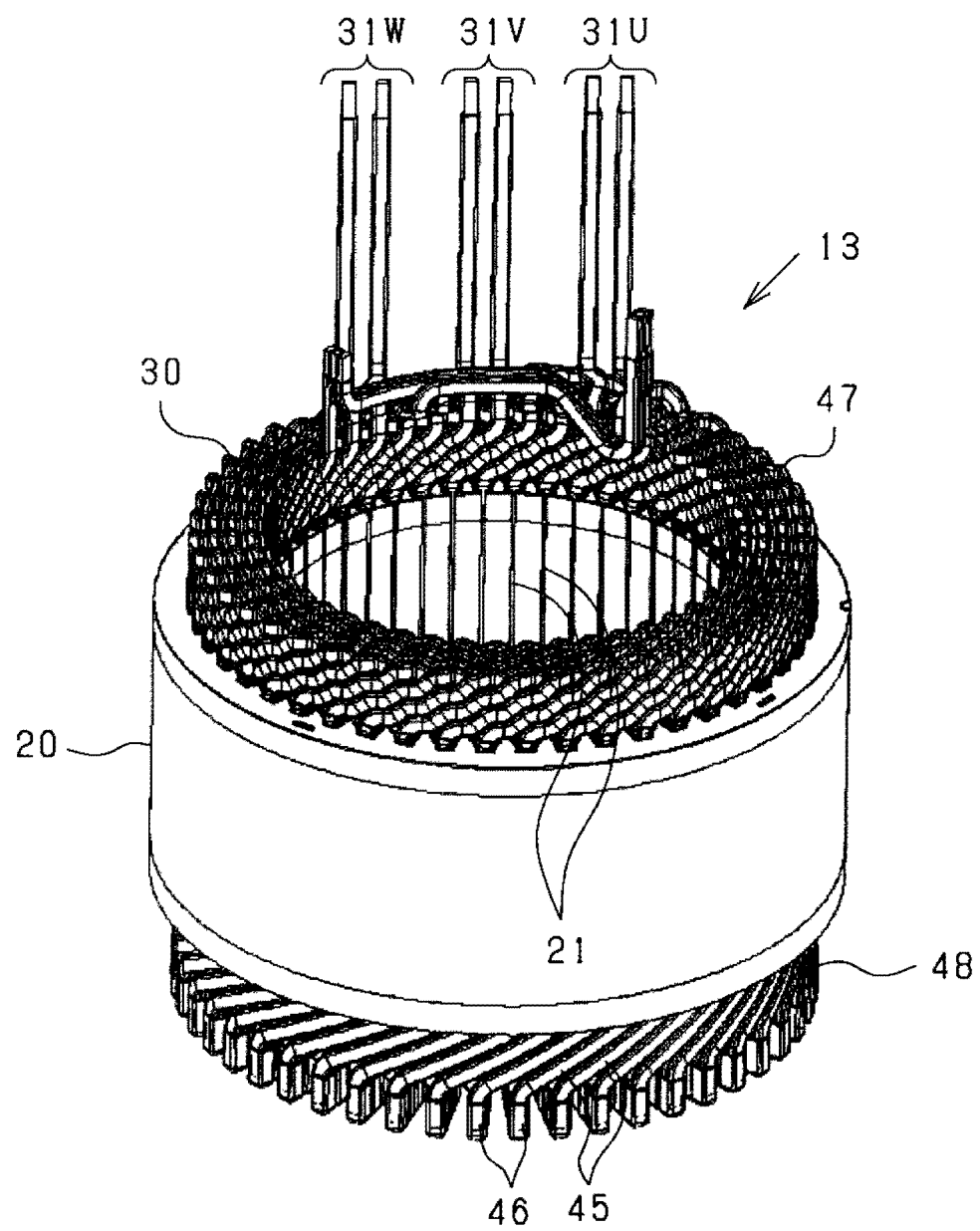
FIG. 2 is an overall perspective view of a stator.
Figure 3:
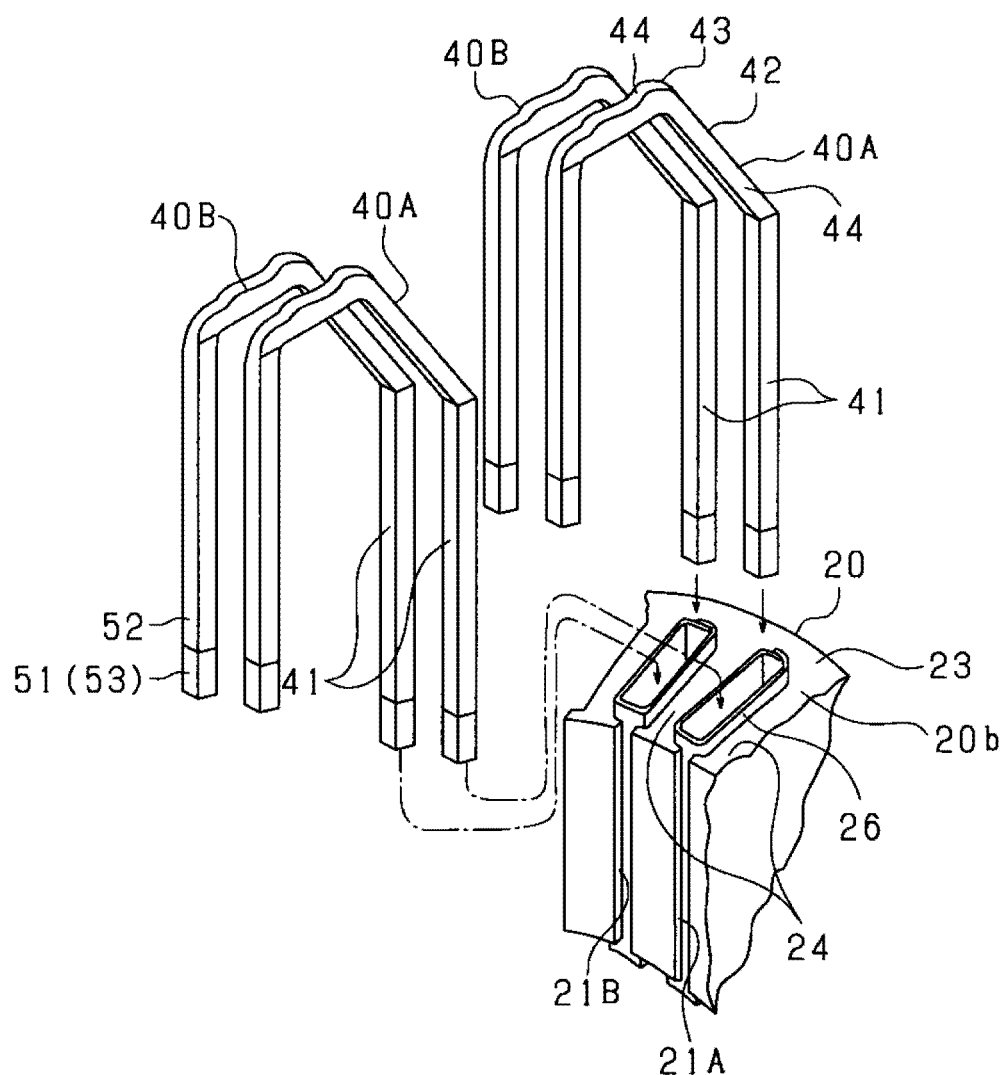
FIG. 3 is descriptive diagram showing a state in which a conductor segment is inserted into a stator core.
Figure 4:
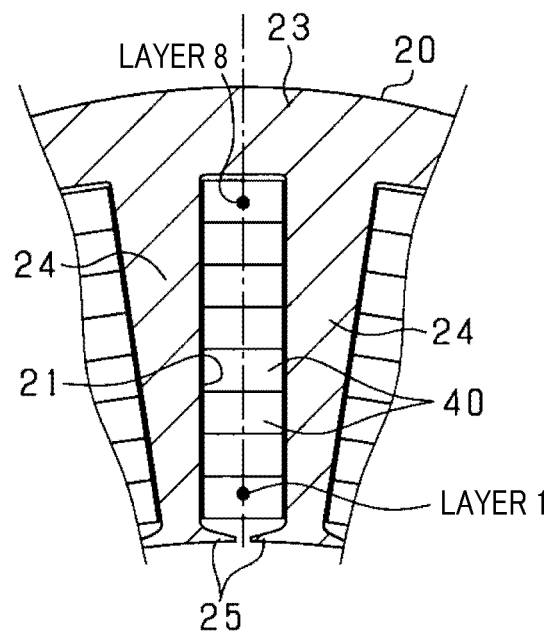
FIG. 4 is a cross sectional view showing a part of the stator.

Next, the stator 13 will be described. As shown in FIGS. 2 to 4, the stator 13 is provided with a circular stator core provided with a plurality of slots 21 arranged in the circumferential direction, and a stator winding provided with three stator windings (specifically, U phase, V phase and W phase). The three-stator windings are distributed and wove around the slots 21 provided on the stator core 20.

The stator core 20 has a plurality of annular electromagnetic plates 20a (as shown in FIG. 1) that are laminated in an axial direction of the stator core 20. The stator core 20 includes an annular back core 23, and a plurality of teeth 24 that are arranged in a circumferential direction that protrude towards an inner-side in the radial direction, and have a predetermined distance provided therebetween. The slots 21 are provided between the teeth 24 that are arranged adjacent to each other.

A flange 25 is formed as an inner wall section on a front-end of each of the teeth 24. The number of slots 21 that are formed on the stator core 20 is two slots per 1 phase of the stator winding 30, for each NS magnetic poles (8 magnetic poles). In the present embodiment, specifically, the total number of slots is 48, which is calculated as 8×3×2=48. The 48 slots 21 are composed of U phase slots, V phase slots and W phase slots. The slots 21 are arranged in groups of two that are repeatedly disposed in the circumferential direction thereof.

Each slot 21 is formed as an opened portion that extends in the radial direction of the stator core 20, as length-wise direction of the slot. A plurality of conductor segments 40 can be arranged in the length-wise direction of the slot 21. In the present embodiment, the slot 21 has the flange 25 which is intervened at an end portion of on an inner-side of the core. The slot 21 is formed as semi-closed slot in which a part of the slot that is opened, however may also be formed as a closed slot, in which an end of the slot on a core inner-side is closed off by an inner-wall portion, or formed as open slot without an inner-wall portion.

The stator winding 30 is configured of a plurality of conductor segments 40 that form a substantial U shape. The conductor segment 40 is formed of a pair of linear shaped portions 41 and a turn portion 42 that connects the pair of linear shaped portions 41. The pair of linear shaped portions 41 have a length that is greater than a thickness direction of the stator core 20. In a center of the turn portion 42, a tip portion 43 is provided to extend along an end surface 20b of the stator core 20, and an oblique portion 44 that is inclined to a predetermined angle relative to the end surface 20b of the stator core 20 is provided on each end of the tip portion 43.

The conductor segment 40 is configured of a copper conductor 51 that has an elongated linear cross sectional surface, and a covered conductor linear portion that is covered by the insulation cover 52 that covers an outer peripheral surface of the conductor 51. The conductor segment 40 is formed in a substantial U shape by plastic deformation. In consideration of the thermal requirement of the conductor segment 40 of the insulation cover 52, a highly heat-resistant resin material, for example, polyimide (PI) is used, and the insulation cover 52 is in an attached state to the conductor 51.

As shown in FIG. 3, an end of the linear shaped portion 41 (provided on an end that opposed to the turn portion 42) is an exposed portion 53 that is exposed by the conductor 51. The exposed portion 51 is formed by removing the insulation cover 52 from the conductor segment 40 at that particular part of the conductor segment 40. Incidentally, when the conductor segment 40 is inserted into the slot 21, a width dimension of the slot 21, is smaller than a width of the opening of the slot 21 in a circumferential direction of the core.

It is noted that a material of the conductor 51 may be formed from a tough-pitch copper that is a pure copper used as an electrical conductor line, de-oxygenated copper, or a copper alloy that has copper as a main substance. On the other hand, the conductor may also be formed from pure aluminum that is used in an electric conductor line, or an aluminum alloy that has aluminum has a major substance, for example. A material that is used to form the insulation cover 52 may is optional. That is specifically, a polyimide, polyamide-imide, polyester, polyurethane, polyether-imide, polyphenylsulphone, polyphenylene-sulfide, and polyether ethyl keton, for example, may be used. On the other hand, a plurality of laminated insulation covers may also be formed from a plurality of the materials mentioned above.

The stator core 20 is provided with the plurality of the conductor segments 40 inserted into the slots 21, in the radial direction of the core. That is, the stator core 20 has two slots 21A, and 21B provided for the same phase that are adjacent to each other in the circumferential direction and conductor segments 40A and 40B. In this case, the two conductor segments 40A and 40B that are provided as one pair, are respectively inserted into the slots 21A and 21B.

As shown in FIG. 3, the linear portions 41 of the two conductor segments 40A and 40B are not inserted into the same slot, however, respectively inserted into different slots, specifically the slots 21A and 21B, which are adjacent to each other. In this way, the linear portions are thus inserted into the slots 21A and 21B from one end of each linear portion 41, in the axial direction. Specifically, among the two conductor segments 40A and 40B shown in FIG. 3 on the left-hand side, the conductor segment 40A has a first linear portion 41 inserted into a first slot 21A, that is positioned on the outermost layer (an eighth layer), and a second linear portion 41 which is inserted into a second slot 21A positioned on a seventh layer (omitted from the figures) on a first pole pitch in an anti-clockwise direction of the stator core 20 and distanced from the first slot 21A.

The conductor segment 40B has a first linear portion 41 inserted into a first slot 21B that is adjacent to the first slot 21A, on the outermost layer (the eighth layer), and a second linear segment 41 that is inserted into a second slot 21B positioned on the seventh layer (omitted from the figures) on the first polar pitch in the anti-clockwise direction of the stator core 20 and distanced from the first slot 21B.

In other words, the two conductor segments 40A and 40B are arranged in slots of one slot pitch difference from each other in the circumferential direction. According to the configuration, the linear portions 41 of the conductor segments 40 are inserted into the odd numbered slots 21 among the total slots 21. In the present embodiment, a total of eight linear portions 41 are aligned into a single line in the radial direction, and in this state, the eight linear portions 41 are inserted into a slot 21 and accommodated inside the slot 21.

An insulation sheet 26 that provides electric insulation between the stator 20 and the stator winding 30 (conductor segment 40) is provided inside the slot 21. The insulation sheet 26 is folded and bent according to the shape and size of the plurality of conductor segments 40 (in the present embodiment, 8 conductor segments) that are inserted into the slots 21, and disposed to surround the plurality of conductor segments 40 as a whole. The insulation sheet 26 is thus arranged to intervene between an inner wall surface of the stator core 20 on the inside of the slot 21 and the conductor segment 40. The insulation sheet 26 protrudes further to an outside than the end surface 20b of the stator core 20.

The pair of linear portions 41 for each conductor segment 40 have tip ends that extend from the slots 21 towards another end in the axial direction (FIG. 3 lower side). These particular tip ends are turned to opposed sides from each other to a predetermined angle from the end surface 20b of the stator core 20, in the circumferential direction thereof (refer to FIG. 2). This operation is performed by obliquely turning the tip-ends of the linear portions 41 to form a twisted portion 45 that has a length which is substantially half of a length of a pole pitch section (refer to FIG. 2). Thereafter, the tip-ends of the twisted portions 45 for two layers of conductor segments 40 are joined to each other by welding or caulking, for example, at the other end in the axial direction of the stator core 20. The conductor segments 40 are thus electrically connected to each other by a predetermined pattern. Specifically, the pair of linear portions 41 for each conductor segment 40 are arranged next to each other in the radial direction, with one layer difference between the two linear portions. In this way, since the twisted portion 45 is formed towards the opposed side in the circumferential direction for each layer, the conductor segments 40 are continuously connected to each other.

In this configuration, predetermined segments 20 are connected in a straight line, and an m layers (when m is given as a natural number of one or more) that is housed inside each of the slots 21 and a slot housing portion (linear portion 41) are electrically connected. According to the configuration, the phase windings 31Y, 31V and 31W are each respectively wave wound along the slots 21 in the circumferential direction of the stator core 20, and a stator winding 30 is thus formed from each of the phase windings 31U, 31V and 31W. It is noted that a winding end of each phase winding 31U, 31V and 31W are joined wire that is joined by a star connection.

The stator winding 30 is wound around the stator core 20 so that a plurality of the turns 42 are projected from the end surface 20b of the first-end side to an outside of the slot 21. According to this configuration, in total a ring shaped coil-end portion 47 (refer to FIG. 2) is formed.

Also, on the second end-side in the axial direction of the stator core 20, the plurality of twisted portions 45 and terminal joining portions 46 are projected from an end surface thereof to an outside of slots 21 and a whole configuration of a ring shaped coil-end portion 48 is thus formed (refer to FIG. 2). At the coil-end portion 47, six slot pitches are electrically connected between slots by the turn portions 42 on the conductor segment 40, and at the coil-end 48, the six slot pitches are not electrically connected therebetween by the twisted portion 45 and the terminal-joining portion 46.

Hereafter, joining of the conductor segments will be described in detail. An enlarged perspective view of a conductor joining state at the coil-end portion 48 is shown in FIG. 5, and a cross sectional diagram of the conductor-joining portion is shown in FIG. 6.

Figure 5:
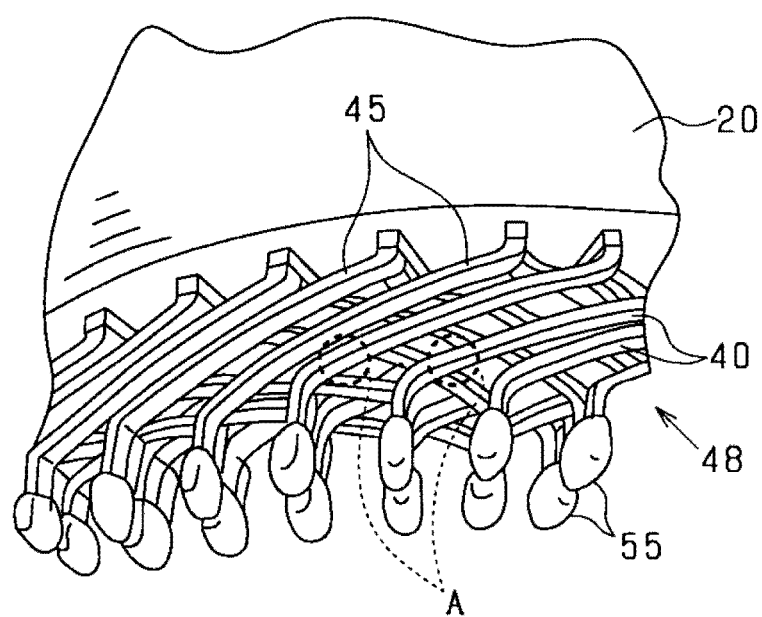
FIG. 5 shows an enlarged perspective view of a conductor joined state at the coil-end portion.
Figure 6:
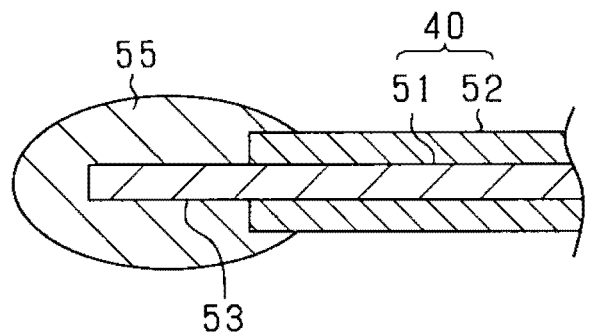
FIG. 6 is a cross sectional view of the conductor-joining portion.

As shown in FIG. 5 and FIG. 6, an exposed portion 53 of the conductor 51 is provided on a tip end of the conductor segment 40, and each conductor 51 is joined to another conductor 51 by welding or caulking, for example, the conductors together. A conductor joined portion that is composed of the conductors 51 joined together is covered by the insulator 55, in at least a range that includes an end portion of the insulation cover 52. It is noted that insulator 55 is formed of a resin powder. In a manufacturing process of the powder resin, air is delivered into a tank that contains a powder resin, and in this state the resin is mixed. A preheated conductor joined portion is submerged into the tank containing the resin, the powdered resin melts due to the heat from the conductor joined portion and the insulator 55 is thus formed on a surface of the conductor portion. For example, an insulation material that includes, an epoxy type, and a polyester type resin components, may be used as a major resin component.

Incidentally, when the electric rotating machine 10 is used, reoccurrence of changes in the temperature, from room temperature to a temperature that exceeds room temperature, may cause the insulator 55 to crack at the end portion or near to the end portion of the insulation cover 52 for the conductor segment 40. Furthermore, there are also concerns of cracks on the insulator progressing for example, the insulator 55 detaching from the conductor segment 40, as a consequence.

For example, in the event where a linear expansion coefficient differs between the insulation cover 52 of the conductor segment 40 and the insulator 55 that covers the joined conductors, or stress concentration that is caused by a change in the temperature occurs at the end portion of the insulation cover 52, for example, in such events cracking of the insulator 55 may arise as a consequence.

Figure 7:
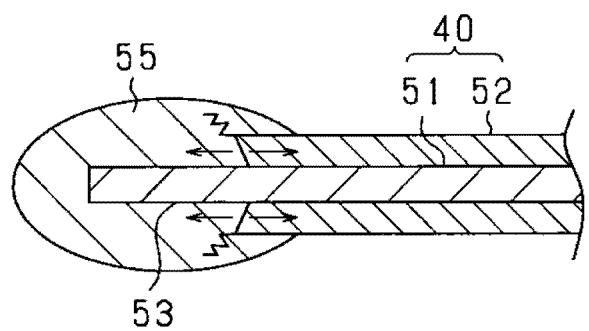
FIG. 7 is a cross sectional view of the conductor-joining portion.

In other words, as shown in FIG. 7, if a change in the size of the insulation cover 52 occurs (contraction or expansion) in a different situation from the insulator 55 described above, and such changes occur in a peripheral area of the end portion of the insulation cover 52 on an inside of the insulator 55, this may result in repeated changes in stress to the insulator 55. In this regard, cracking and breaking, for example, of the insulator 55 may be caused by a change in stress. It is noted that a linear expansion ratio of the insulation cover 52 is larger than a linear expansion ratio of the insulator 55.

Also, since an inner peripheral side of the insulation cover 52 is attached to the conductor 51, a position that is nearer to an outside of the insulation cover 52 is a position that is distanced from an adhesive part of the conductor 51. As a consequence, the insulation cover 52 expands and contracts at a linear expansion ratio of the resin material itself, and the level of expansion and the contraction is greater on the outer peripheral side of the insulation cover 52 than at an inner peripheral side (that is a side peripheral to an outer surface of the conductor 51). In the configuration described, there are, however, the concerns of cracking of the insulation cover 52 that is initiated on an outer end thereof, as a consequence.

Figure 8:
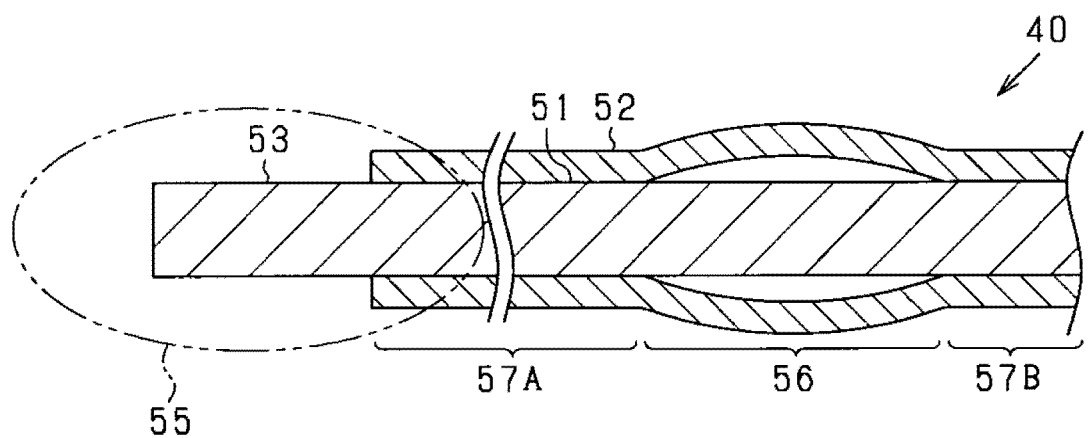
FIG. 8 is a cross sectional diagram of the conductor segment.

In the present embodiment, as shown in FIG. 8, the insulation cover 52 covers the conductor 51 in an attached state thereto, on the conductor segment 40, in contrast, the low-adhesion portion 56, in which the insulation cover 52 is not attached to the conductor 51 is provided in a predetermined position that is distanced from an end portion on a side of the exposed portion 53.

It is noted that the low-adhesion portion 56 may also be a portion that has a lower adhesive strength to the conductor 51 than the other parts of the insulation cover 52. As shown in FIG. 8 the conductor 55 is indicated with a virtual line, and the low-adhesion portion 56 is provided in a position that is distanced from the end portion of the insulation cover 55, on an outside of the insulator 55.

The adhesion portions 57A and 57B that have a higher adhesive-strength than the low-adhesion portion 56 are provided between the side of the exposed portion 53 and the low-adhesion portion 56. Specifically, the adhesion portions 57A and 57B are provided on opposed side to the exposed portion 53 with the low-adhesion portion 56 intervened in-between. It is noted that a length of the adhesion portion 57A from an end of the insulation cover 52 (specifically, a distance from the end of the insulation cover 52 to the low-adhesion portion) is less than 5 cm and preferably less than 3 cm, for example.

As described above, since the insulation cover has the low-adhesion portion 56 that is configured on a part thereof, the insulation cover 53 is in a floated state, specifically, an adhesion-free state to the conductor 55 around the low-adhesion portion 56. Therefore, if a size of insulation cover 52 changes, relative to the insulator 55 that covers the conductor segment (for example, a change in the size of the insulation cover 52 in the length wise direction of the conductor 40), the size change of the insulation cover 52 is adsorbed at the low-adhesion portion 56, and additional stress (shear stress) to the conductor 55, which is caused by the change in the size of the insulation cover 52 is decreased. As a result, occurrence of cracks in the insulator 55, for example, is suppressed.

It is noted that in situation where the low-adhesion portion 56 has a comparatively low adhesive strength to the conductor 51, a change in the size of the insulation cover 52 is adsorbed by the low-adhesion portion 56, as long as the insulation cover 54 is extensionally moveable on the conductor surface, in situations where the size of the insulation cover tends to change. Thus, effect of suppressing the cracking of the insulation cover 55 can be anticipated.

In general, it is considered that the insulation cover 52 has a pulling residual stress on the conductor segment 40. The pulling residual stress may occur when the insulation cover is formed by polymerization of the insulation cover on the conductor after the insulation cover is varnish coated onto the conductor, or may occur due to wire expansion when the cover conduction wire is wound onto a reel. On the other hand, pulling residual stress may also occur when the stator is processed at the point of manufacturing. The residual stress that occurs when the segment 40 is manufactured, or the elastic deformation of the insulation cover 52 that occurs at a process point after the segment is manufactured are preserved, and the stress of the insulation cover 52 is thus maintained without decreasing. In the configuration described, since the adhesion portion 57A is provided between the end on the exposed portion side and the low-adhesion portion 56, the pulling residual stress is maintained at the low-adhesion portion 56, by the adhesion portion 57A. As a result, if the size of the insulation cover 52 expands with a temperature change, for example, the size expansion of the insulation cover is desirably adsorbed at the low-adhesion portion 56, whilst using the pulling residual stress.

Figure 9A:
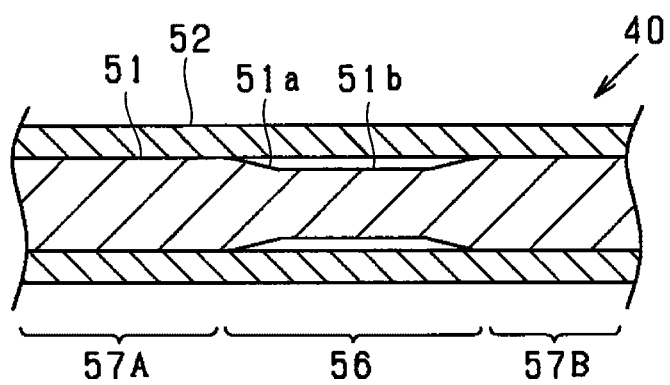
FIG. 9a-9c is a diagram describing a configuration of the low-adhesion portion on the conductor segment.
Figure 9B:
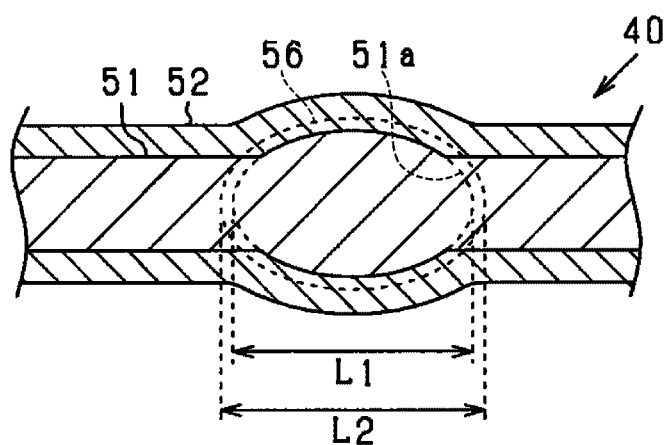
Figure 9C:
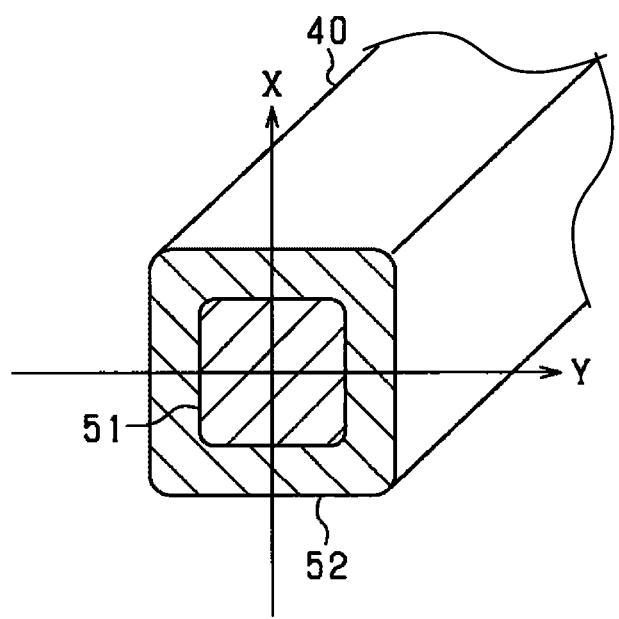

Next, the low-adhesion portion 56 of the conductor segment 40 will be described in detail. FIG. 9 is a configuration of the low-adhesion portion 56 on the conductor segment 40, (a) shows a cross section drawing of the conductor segment 40 at a cross sectional surface extending in a X direction, shown in (c), (b) shows a cross section configuration at a cross sectional surface extending in a Y direction shown in (c).

In FIG. 9, the conductor 51 has a recessed part 51a that is recessed on the conductor surface. The recessed part 51a is formed on the conductor 51 by pressing a surface of the conductor 51 to a cross sectional inner-side of the conductor. The recessed part is recessed in a predetermined direction (X direction) of the conductor 51, and also expanded in an orthogonal direction (Y direction) to predetermined direction to form an expanded portion.

As a result, the recessed part 51a has flat oval shaped surface 51b in the recessed part 51a. The low-adhesion portion 56 of the insulation cover 52 covers the recessed part 51a. That is, the recessed part 51a is formed on two conductor side surfaces that are arranged in the X direction of the conductor 51, and the low-adhesion portion 56 is provided along the two conductor surfaces. It is noted that the conductor segment 40 is pressed using a pressing process and, the conductor 51 is thus recessed in the X direction, and expanded in the Y.

Since the recessed part 51a is formed in this way on the conductor 51, the insulation cover 52 easily floats over the conductor 51. Additionally, since recessed part 51a is formed with the conductor 51 in the pressed state, the insulation cover 52 is pulled in a length-wise direction of the conductor 51 and also in a direction orthogonal thereto, and the insulation cover 52 easily floats over the conductor 51. As a result, the low-adhesion portion 56 is desirably configured on insulation cover 52.

That is, an outer-edge on a side of the exposed portion has an oval shape formation, in the recessed part 51a. The low-adhesion portion 56 is provided in range that expands to the outer-side of the recessed part 51a. That is, the low-adhesion portion 56 is arranged such that starting point of the low-adhesion 56 that is positioned further towards an outside than a starting point of the recessed part 51, in the length-wise direction of the conductor segment 40. As shown in FIG. 9 (b), a length L1 of the recessed part 51a, has a smaller dimension than a length L2 of the low-adhesion portion, when viewed in the length-wise direction of the segment 40 (L1<L2).

Since the outer edge of the recessed part 51a is an oval shape, an interface between the low-adhesion portion 56 and the adhesion portions 57A and 57B is also oval shaped. Therefore, excess spreading of the low-adhesion portion 56 is suppressed, and an excess decrease in the adhesive strength between the conductor 51 and insulation layer 52 is also suppressed. That is, if stress concentration occurs at a corner portion, for example, of the interface between the low-adhesion portion 56 and the adhesion portion, the insulation cover tends to easily rip at the stress concentration point, by the contraction and expansion that occurs as a result of the pulling stress of the low-adhesion portion 56 or a change in the temperature, for example, and undesirable spreading of the low-adhesion portion may be also be increased as a consequence.

In view of this issue, according to the configuration described above, such stress concentration occurs with difficulty at the interface between the low-adhesion portion 56 and the adhesion portion, therefore, the size of the low-adhesion portion 56 is desirably maintained.

Furthermore, the low-adhesion portion 56 is arranged to cover a larger region than the recessed part 51a, in the length-wise direction of the conductor segment 40, in other words, the recessed part 51a is provided in smaller range than the low-adhesion portion 56. As a result, whilst providing the low-adhesion portion 56 on the insulation cover 52, the size of the recessed part 51a may be kept small, and thus a decrease in the motor efficiency, for example, that is caused by the recessed part 51a is suppressed. Specifically, if the recessed part 51a is provided on the conductor 51, concerns of decreased efficiency of the motor that is caused by a decrease in the cross-sectional size may arise. In this view, by maintaining the recessed part 51a at a relatively small size, the low-adhesion portion 56 is desirably configured by the formation of the recessed part 51a and the decrease in the motor efficiency can also be suppressed.

In the present embodiment, as a method to actively decrease the adhesive strength of the insulation cover 52 on the conductor 51, an oxidized layer is formed on a surface of the conductor 51 at the low-adhesion portion 56. In a case of using a copper conductor 51, an oxidized layer is formed on the surface of the conductor 51 by using copper oxide (CuO and CuO2). In this case, an oxidized layer is formed on a surface of the conductor 51 with the conductor 51 covered by the insulation cover 52. The adhesive strength of the insulation cover to the conductor 51 is thus decreased by oxidation that occurs on the surface of the conductor surface.

Figure 10:
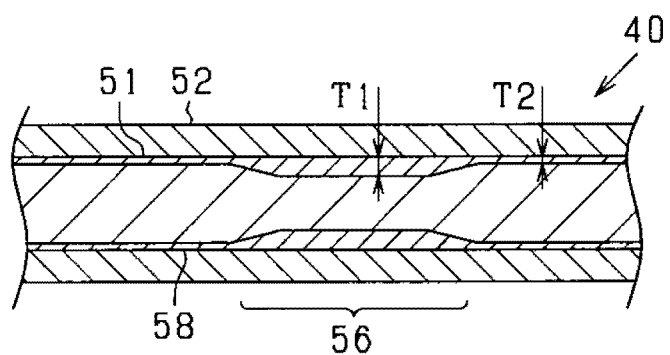
FIG. 10 is a diagram describing the configuration of the low-adhesion portion on the conductor segment.

Specifically, as shown in FIG. 10, an oxidized layer 58 is formed on the surface of the conductor 51, (specifically, between the conductor 51 and the insulation cover 52) in a vicinity of the adhesion-free portion of the conductor segment 40. It is noted that the oxidized layer 58 is configured by oxygen that passes through the insulation membrane 52, therefore it is considered that the oxygen membrane is formed along the entire conductor segment 40. Accordingly, in FIG. 10, the oxidized layer 58 is formed along the entire length-wise direction of the conductor 51, and the low-adhesion portion 56 and other sections are formed in accordance with the difference in thickness of the oxidized layer 58. A thickness of the oxidized layer on the low-adhesion portion 56 is given as T1 and the thickness of the oxidized layer 58 on the other sections is given as T2 (T1>T2). In order to change the thickness of the oxidized layer, a section of the low-adhesion portion 56 may be subjected to localized exposure to a high oxygen atmosphere, for example, and a relatively thick oxidized layer 58 may be thus formed in the vicinity of the low-adhesion portion 56.

Figure 11:
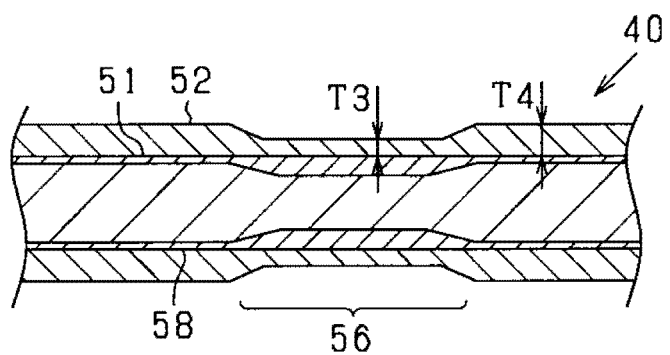
FIG. 11 is a diagram describing the configuration of the low-adhesion portion on the conductor segment.

In FIG. 11, a thickness of the insulation cover 52 differs between the low-adhesion portion 56 and the other sections on the conductor segment 40. A thickness T3 of the insulation cover at the low-adhesion portion 56 is lower than the thickness T4 of the insulation cover 52 on the adhesion portion that is adjacent to the low-adhesion portion 56 (T3<T4). Since high amounts of oxygen pass through the insulation cover 52 at the low-adhesion portion 56 that has the lower thickness, the conductor 51 is easily oxidized, and a desirable low-adhesion portion 56 is provided.

An end portion of the conductor segment 40 is the coil-end portion 48 that protrudes in the axial direction from the slot 21 to an outside. A twisted portion 45 and a terminal-joining portion 46 is formed on the coil-end portion 48, and in the configuration, the low-adhesion portion 56 is provided on the coil-end portion 48. Specifically, the low-adhesion portion 56 may be formed in a range that is less than half of a total length of the coil-end portion 48, when the length of the coil end portion 48 is measured from the exposed portion 53. For example, the low-adhesion portion 56 is provided in a part labeled A shown in FIG. 5.

Since the coil-end portion 48 has the plurality of the conductor segments 50 have middle portions that are free and un-joined, the low-adhesion portion 56 can be desirably provided. Additionally, since the low-adhesion portion 56 is arranged near to the insulator 55 on the coil-end portion 48, changes in the size of the insulation cover 52 are desirably adsorbed by the low-adhesion portion.

Figure 12:
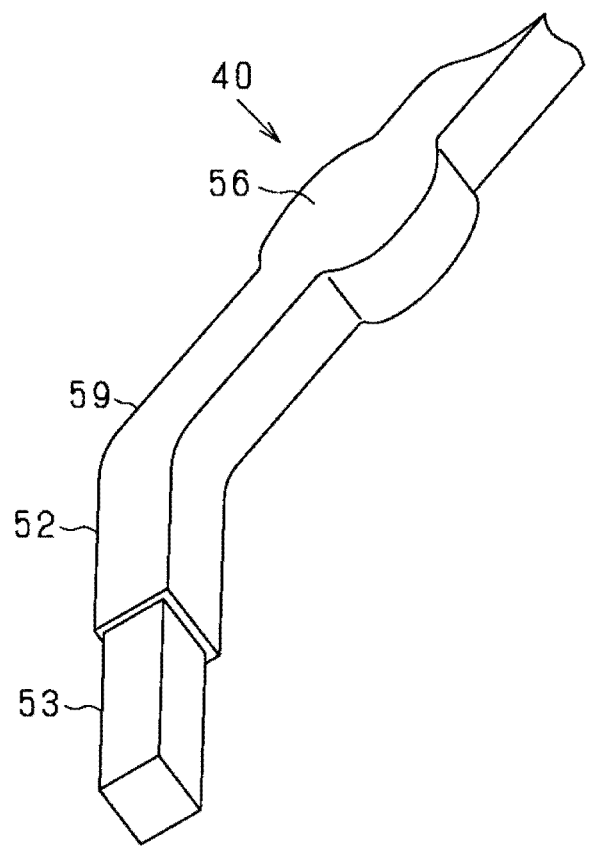
FIG. 12 is a perspective view showing a front-end portion of the conductor segment.

Furthermore, the low-adhesion portion 56 is desirably positioned in consideration of a bending direction of the coil-end portion 48, on the conductor segment 40. That is, as shown in FIG. 12, the bent portion 59 is arranged in a vicinity of a front-end portion so that the conductor 51 is joined to another conductor 51 on the conductor segment 40. Furthermore, the exposed portion 53 is arranged on one end with a bent portion 59 intervened between the exposed portion 53 provided on the one end and the low-adhesion portion 59 provided on a second end of the conductor segment 40. The low-adhesion portion 59 is provided on a surface that is orthogonal to a bent surface provided on an inner-side and outer-side of the bent portion, on the conductor segment 40.

The conductor segments 40 are entwined on the slots 21 of the stator core 20, in an arranged direction of conductor segment 40. The entwinement of the conductor segments 40 is formed by bending the conductor segments in an orthogonal direction to an initially arranged segment direction (specifically, the core circumferential direction) and in this state, a low-adhesion portion 56 is formed on two surfaces, in the core radial direction.

However, if the bent portion 59 is provided on the conductor segment 40, it may be difficult for the low-adhesion portion 56 to adsorb the change in the size of the insulation cover 52, at each of the surfaces on the inner-side and the outer-side of the bent portion 59. In view of this concern, since the low-adhesion portion 56 is provided on a surface that is orthogonal the surfaces that are provided on the inner-side and the outer-side of the bent portion 50, changes in the size of the insulation cover 52 is desirably adsorbed at the low-adhesion portion 56 on the conductor segment 40.

Next, effects of the embodiment will be described in detail.

In the configuration described, since the low-adhesion portion 56 is arranged in a position that is distanced from the end portion on the side of the exposed portion 53, cracking of the insulator 55 that is caused by a change in the size of the insulation cover 52, for example, is suppressed, and the stator winding 30 can be desirably protected.

The adhesion portion 57A is provided between the end portion on the side of the exposed portion 53 and the low-adhesion portion 56, therefore, pulling residual stress at the low-adhesion portion 56 is maintained by the adhesion portion 57A. Furthermore, size expansion of the insulation cover 52 is desirably adsorbed at the low-adhesion portion 56, using the pulling residual stress.

The recessed part 51a is formed on the conductor 51, and the low-adhesion portion 56 is positioned to cover the recessed part 51a. Specifically, a recess is formed in predetermined cross sectional direction and expanded in the direction that is orthogonal to the predetermined cross sectional direction, at a position in which the recessed part 51a is formed on the conductor 51. Thus, according to the configuration, the insulation cover 52 easily floats over the conductor 51, and the low-adhesion portion 56 can be desirably configured.

Furthermore, since the outer frame of the recessed part 51a is oval shaped, the interface between the low-adhesion portion 56 and the adhesion portion 57A is an oval shape. As a consequence, excessive expansion of the low-adhesion portion 56, for example, is suppressed, and a size thereof is desirably maintained.

The low-adhesion portion 56 is formed to cover a larger region than the recessed part 51a, in the length-wise direction of the conductor segment 40. Therefore, whilst providing the low-adhesion portion 56 on the insulation cover 52, the size of recess part 51a may be kept small, and a decrease in the motor efficiency that is caused by the recess part 51a, for example, is suppressed.

In the configuration described, the low-adhesion portion 56 is arranged on surface that is positioned in the orthogonal direction of the surfaces on the inner-side and the outer-side of the bent portion 59, on the conductor 40. Therefore, the change in size of the insulation cover 52 is desirably adsorbed at the low-adhesion portion 56, regardless of the configuration of the bent portion 59.

A thickness of the insulation cover 52 is lower at the low-adhesion portion 56, than the thickness at the adhesion portion, which is adjacent to the low-adhesion portion 56. According to the configuration, the oxidized layer at the low-adhesion portion 56 can desirably have a greater thickness than the oxidized layer that is formed on the other parts of the conductor segment 40, and the low-adhesion portion 56 may be partially configured on the insulation cover 52.

Furthermore, since the oxidized layer at the low-adhesion portion 5 has a greater thickness than the oxidized layer on the adhesion portion adjacent to the low-adhesion portion 56, a stable low-adhesion portion 56 can be formed on the conductor segment 40.

The low-adhesion portion 56 is configured on the coil-end portion 48. In particular, the low-adhesion portion 56 is formed in a range that covers less than half of the total length of the coil-end, when the length of the coil end is from the exposed portion 53.

Hereafter, a method of forming the low-adhesion portion 56 on the conductor segment 40 will be described.

(1) In a pressing process or a heating process, the recessed part 51a is formed on the conductor 51 at a shear stress that is equal to or higher than the adhesive force between the conductor 51 and the insulation cover 52. In this case, the low-adhesion portion 56 is formed on the conductor segment 40 by peeling of the conductor cover 52 from the conductor 51. According to the method described, a managing cost and manufacturing cost is reduced.

(2) In the pressing process or the heating process, the recessed part 51a is formed on the insulation layer 52 at a shear stress that is equal to or higher than the adhesive force between the conductor 51 and the insulation cover 52, and equal to or lower than a yield stress of the insulation cover 52. According to the process described, the low-adhesion portion 56 is formed on the conductor segment 40 by peeling the insulation cover 52 from the conductor 51, and at this point, membrane thinning of the insulation cover 52 as a consequence of the process can be suppressed. Furthermore, a decrease in insulation reliability can also be suppressed.

(3) In a pressing process or a heating process, the recessed part 51a is formed on the conductor 51 at an adhesive strength that is equal to or higher than the adhesive strength between the conductor 51 and the insulation cover 52, and a yielding stress that is equal to or lower than the insulation cover, and also a shear stress that is that is equal to or higher than a yield stress of the conductor. According to the configuration, the low-adhesion portion 56 may be formed on the conductor segment 40 by peeling the insulation cover from the conductor 51 at that particular part of the cover membrane. Furthermore, undesirable thinning of the insulation cover 52 due to the processing thereof is suppressed.

According to the configuration, a deterioration of insulation reliability is suppressed. Furthermore, the low-adhesion portion 56 can be reliably formed on the conductor segment 40.

Other Embodiments

The embodiments may be modified as follows.

A surface in which the low-adhesion portion 56 is formed on the conductor segment 40 in a periphery of the conductor is optional. For example, the low-adhesion portion 56 may be formed on one surface among the four surfaces of the conductor. In contrast, a configuration in which the low-adhesion portion 56 is configured on three surfaces or four surfaces of the conductor segment may also be provided. That is, the adhesion portion 56 may be provided on at least one surface of the conductor 51. It is however considered that the higher the number of surfaces that have the low-adhesion portion 56, the more the shear stress applied to the insulator 55 is decreased, and suppression of cracking of the insulator may also be enhanced.

The conductor segment 40 may also be configured without the recessed part 51a on the conductor 51. Furthermore, in a configuration in which the recessed part 51a is not configured on the conductor 51, the interface between the low-adhesion portion 56 and the adhesion portions 57A and 57B may be formed as an oval shape. According to the configuration described, excess broadening of the low-adhesion portion 56 is suppressed and a size of the low-adhesion portion 56 may be desirably maintained.

In the embodiments described, the co-efficient linear expansion of the insulation cover 52 is larger than the co-efficient linear expansion of the insulator 55, however, the configuration described may also be changed. For example, the co-efficient linear expansion of the insulation cover 52 may be provided as a smaller value than the co-efficient linear expansion of the insulator 55, and in this configuration, cracking of the insulator may also be suppressed.

Figure 13:
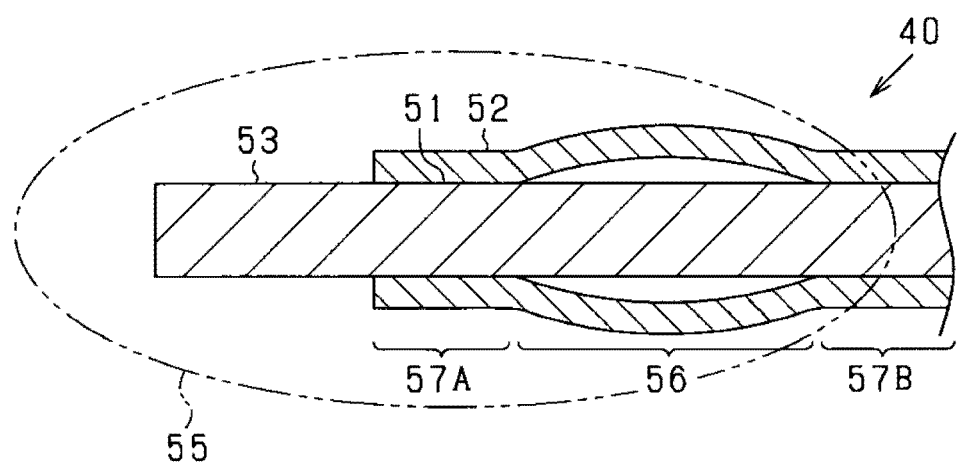
FIG. 13 is a cross sectional view of the conductor segment.

As a method to decrease the adhesive strength between the conductor 51 and the insulation cover 52, the conductor 51 may be covered with oil prior to forming the insulation cover 52, thereafter, the A configuration shown in FIG. 13 may also be employed. In FIG. 13, the insulator 55 is shown with a virtual line, and a low-adhesion portion 56 is arranged on an inner-side of the insulator 55.

The conductor segment 40 is not limited to a cross sectional rectangular shape and may also be a cross sectional circular shape, for example. That is the conductor segment 40 may be a rounded wire part or a rectangular wire part.

The electric rotating machine is used as a vehicle mounted generator, an electric machine or a device that includes and elicits the functions of both the above-mentioned machines.

The present disclosure has been described in conformity with the exemplified embodiments, however, it is to be understood that the present disclosure is not limited to the embodiments and the configuration described. The present disclosure includes various modifications and the equivalents thereof. The embodiments of the present disclosure includes various combination and modes, which have one or more than one elements, without departing from the essence and scope of the disclosure.

What is claimed is:

1. A stator for an electric rotating machine, comprising;
   a stator core having a plurality of slots arranged in a circumferential direction thereof, and a stator winding that is wound in the slots, the stator winding including a plurality of covered conductor linear portions that are linear shaped conductors which are covered by an insulation cover,
   the covered conductor linear portions having exposed portions that are formed on end portions of the covered conductor linear portions and are exposed from the conductors, and
   the plurality of the conductor linear portions are joined to each other by joining, at an exposed portion thereof, one conductor to a second conductor to form a conductor-joining portion, each conductor-joining portion being covered by an insulator, in at least a range that includes an end portion of the insulation cover,
   wherein the insulation cover is configured to cover the conductor in an adhered state to the conductor, and has a low-adhesion portion that is either adhesive-free or has lower adhesive-strength than other parts of the insulation cover, to the conductor, the low-adhesion portion being arranged in a position that is distanced from the end on a side of exposed portion.

2. The stator for an electric rotating machine according to claim 1, wherein the insulation cover includes an adhesion portion that is disposed between the end side of the exposed portion and the low-adhesion portion, and has a stronger adhesion force than the low-adhesion portion.

3. The stator for an electric rotating machine according to claim 1, wherein the conductor has a surface and a recessed part that is formed on the conductor surface, and the insulation cover covers the recessed part at a section being the low-adhesion portion of the insulation cover.

4. The stator for an electric rotating machine according to claim 3, wherein the recessed part is inverted to a cross-sectional inner surface of the conductor surface, and the conductor has the recessed part that is recessed in a predetermined cross-sectional direction and expanded in a direction that is orthogonal to the predetermined cross sectional direction of the conductor.

5. The stator for an electric rotating machine according to claim 3, wherein the recessed part has an outer edge formed in an oval shape, on the exposed portion side.

6. The stator for an electric rotating machine according to claim 3, wherein the covered conductor linear portion has a length-wise direction, the low adhesion portion has a low adhesion starting point, and the starting point of the low-adhesion portion is arranged further towards an outer side of the covered conductor than a starting point of the recessed portion, in the length-wise direction of the covered conductor.

7. The stator for an electric rotating machined according to claim 1, wherein the low-adhesion portion has an interface that is oval shaped provided between the low-adhesion portion and the adhesion portion.

8. The stator for an electric rotating machine according to claim 1, wherein the covered conductor linear portion has a bent portion that is intervened between the exposed portion being arranged on a first-surface side and the low-adhesion portion being arranged on a second-surface side of the conductor linear portion, the bent portion has a bent surface being curved to an inner side and an outer side on the covered conductor linear portion, and the low-adhesion portion is disposed on a surface that is orthogonal to the bent surface.

9. The stator for an electric rotating machine according to claim 1, wherein the low-adhesion portion that is adjacent to the adhesion portion has an insulation cover thickness that is lower than the insulation cover thickness of the adhesion portion on the insulation cover.

10. The stator for an electric rotating machine according to claim 1, wherein the low-adhesion portion is formed by an oxidized layer on a part that is covered by the insulation cover on the conductor surface.

11. The stator for an electric rotating machine according to claim 10, wherein the oxidized layer at the low-adhesion portion is greater in thickness than the oxidized layer at the adhesion portion that is adjacent to the low-adhesion portion on the conductor surface.

12. The stator for an electric rotating machine according to claim 1, wherein the plurality of covered conductor linear portions have coil-end portions extending in an axial direction from the slots externally, and the conductor joined portion and the low-adhesion portion are provided on the coil-end portions.

13. The stator for an electric rotating machine according to claim 1, wherein the plurality of covered conductor linear portions have coil-portions extending in an axial direction, from the slots externally, and the conductor joined portion and the low-adhesion portion are provided on a coil-end portion, the low-adhesion portion being formed in a range that covers less than half of a length of the coil-end portion.

14. The stator for an electric rotating machine according to claim 2, wherein the conductor has a surface and a recessed part that is formed on the conductor surface, and the insulation cover covers the recessed part at a section being the low-adhesion portion of the insulation cover.

15. The stator for an electric rotating machine according to claim 4, wherein the recessed part has an outer edge formed in an oval shape, on the exposed portion side.

16. The stator for an electric rotating machine according to claim 4, wherein the covered conductor linear portion has a length-wise direction, the low adhesion portion has a low adhesion starting point, and the starting point of the low-adhesion portion is arranged further towards an outer side of the covered conductor than a starting point of the recessed portion, in the length-wise direction of the covered conductor.

17. The stator for an electric rotating machined according to claim 2, wherein the low-adhesion portion has an interface that is oval shaped provided between the low-adhesion portion and the adhesion portion.

18. The stator for an electric rotating machine according to claim 2, wherein the covered conductor linear portion has a bent portion that is intervened between the exposed portion being arranged on a first-surface side and the low-adhesion portion being arranged on a second-surface side of the conductor linear portion, the bent portion has a bent surface being curved to an inner side and an outer side on the covered conductor linear portion, and the low-adhesion portion is disposed on a surface that is orthogonal to the bent surface.

19. The stator for an electric rotating machine according to claim 2, wherein the low-adhesion portion that is adjacent to the adhesion portion has an insulation cover thickness that is lower than the insulation cover thickness of the adhesion portion on the insulation cover.

20. The stator for an electric rotating machine according to claim 2, wherein the low-adhesion portion is formed by an oxidized layer on a part that is covered by the insulation cover on the conductor surface.

* * * * *